(12) United States Patent
Chai et al.

(10) Patent No.: US 10,241,631 B2
(45) Date of Patent: Mar. 26, 2019

(54) HYBRID DISPLAY INTEGRATABLE ANTENNAS USING TOUCH SENSOR TRACE AND EDGE DISCONTINUITY STRUCTURES

(71) Applicant: Intel Corporation, Santa Clara, CA (US)

(72) Inventors: Mei Chai, Marietta, GA (US); Adesoji J. Sajuyigbe, Mountain View, CA (US); Kwan Ho Lee, Mountain View, CA (US); Bryce D. Horine, Portland, OR (US); Harry G. Skinner, Beaverton, OR (US); Anand S. Konanur, San Jose, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/465,261

(22) Filed: Mar. 21, 2017

(65) Prior Publication Data

US 2018/0275789 A1    Sep. 27, 2018

(51) Int. Cl.
*H01Q 1/24* (2006.01)
*H01Q 1/38* (2006.01)
(Continued)

(52) U.S. Cl.
CPC ............. *G06F 3/044* (2013.01); *H01Q 1/243* (2013.01); *H01Q 1/38* (2013.01); *H01Q 1/44* (2013.01);
(Continued)

(58) Field of Classification Search
CPC ........... G06F 3/044; G06F 2203/04112; H01Q 1/243; H01Q 1/48; H01Q 9/0421; H01Q 9/185
See application file for complete search history.

(56) References Cited

U.S. PATENT DOCUMENTS 9,184,502 B2    11/2015  Yang et al.
2010/0321325 A1*  12/2010  Springer ................. G06F 3/041
                                                        345/174
(Continued)

FOREIGN PATENT DOCUMENTS

WO    2018175430    9/2018

OTHER PUBLICATIONS

"International Application Serial No. PCT/US2018/023347, International Search Report dated Jul. 6, 2018", 3 pgs.
(Continued)

*Primary Examiner* — Charles V Hicks
(74) *Attorney, Agent, or Firm* — Schwegman Lundberg & Woessner, P.A.

(57) ABSTRACT

A touch panel for a display may include a touch sensor with a plurality of electrode traces. A first portion of the plurality of electrode traces may form sensing lines configured to receive touch input. The touch sensor includes an edge dummy area between an edge of the touch sensor and an electrode trace of a remaining portion of the plurality of electrode traces. The edge dummy area may be located outside of the sensing lines. The touch panel may further include an antenna with a radiation structure and a ground structure. The radiation structure may be located within a routing traces area outside of the touch sensor. The ground structure may be located within the edge dummy area. The ground structure may include an electrode trace of the plurality of electrode traces located within the edge dummy area of the touch sensor.

25 Claims, 6 Drawing Sheets

(51) Int. Cl.
*H01Q 1/44* (2006.01)
*H01Q 1/48* (2006.01)
*H01Q 9/42* (2006.01)
*G06F 3/044* (2006.01)
*H01Q 19/30* (2006.01)
*H01Q 5/371* (2015.01)

(52) U.S. Cl.
CPC ............... *H01Q 1/48* (2013.01); *H01Q 5/371* (2015.01); *H01Q 9/42* (2013.01); *H01Q 19/30* (2013.01); *G06F 2203/04107* (2013.01); *G06F 2203/04112* (2013.01)

(56) References Cited

U.S. PATENT DOCUMENTS

| | | | | |
|---|---|---|---|---|
| 2011/0298670 | A1* | 12/2011 | Jung | H01Q 1/243 343/702 |
| 2012/0086669 | A1 | 4/2012 | Kim et al. | |
| 2013/0307818 | A1* | 11/2013 | Pope | G06F 3/044 345/174 |
| 2014/0106684 | A1* | 4/2014 | Burns | H01Q 1/243 455/78 |
| 2014/0184460 | A1 | 7/2014 | Yen | |
| 2015/0185928 | A1 | 7/2015 | Son et al. | |
| 2016/0188092 | A1* | 6/2016 | Sebastian | G06F 3/0416 345/174 |
| 2016/0328057 | A1 | 11/2016 | Chai et al. | |
| 2016/0329629 | A1 | 11/2016 | Park et al. | |
| 2017/0075493 | A1* | 3/2017 | Lee | G06F 3/0418 |

OTHER PUBLICATIONS

"International Application Serial No. PCT/US2018/023347, Written Opinion dated Jul. 6, 2018", 6 pgs.

* cited by examiner

HYBRID DISPLAY INTEGRATABLE ANTENNAS USING TOUCH SENSOR TRACE AND EDGE DISCONTINUITY STRUCTURES

TECHNICAL FIELD

Aspects of the disclosure pertain to radio frequency (RF) communications. Some aspects of the disclosure pertain to wireless communication devices. Some aspects of the disclosure pertain to antennas, and more specifically, to a hybrid display integratable antenna. Some aspects of the disclosure relate to an edge antenna integratable within a touch panel display.

BACKGROUND

As mobile and wireless communications continue to develop, touch screen devices have become increasingly popular as input devices. Wireless communication devices, such as mobile phones and tablets, ideally have an edge-to-edge bezel-less display. At the same time, the number of wireless communication protocols (e.g., Wi-Fi, 3G/4G/LTE/5G, FM, etc.) that need to be supported and the related antennas is increasing. Typically, antennas are hidden in the bezel surrounding the display. As touch screen displays of communication devices become closer to being bezel-less, implementing antennas within the communication device becomes more challenging.

BRIEF DESCRIPTION OF THE FIGURES

In the figures, which are not necessarily drawn to scale, like numerals may describe similar components in different views. Like numerals having different letter suffixes may represent different instances of similar components. Some aspects of the disclosure are illustrated by way of example, and not limitation, in the following figures of the accompanying drawings.

DETAILED DESCRIPTION

The following description and the drawings sufficiently illustrate specific aspects of the disclosure to enable those skilled in the art to practice them. Other aspects of the disclosure may incorporate structural, logical, electrical, process, and other changes. Portions and features of some aspects of the present disclosure may be included in, or substituted for, those of other aspects of the present disclosure. Given the benefit of the present disclosure, persons skilled in the relevant technologies will be able to engineer suitable variations to implement principles of the aspects of the present disclosure in other types of communication systems. Various diverse aspects of the present disclosure may incorporate structural, logical, electrical, process, and other differences. Portions and features of some aspects of the present disclosure may be included in, or substituted for, those of other aspects of the present disclosure. Aspects of the disclosure set forth in the claims encompass all presently-known, and after-arising, equivalents of those claims.

Figure 1:
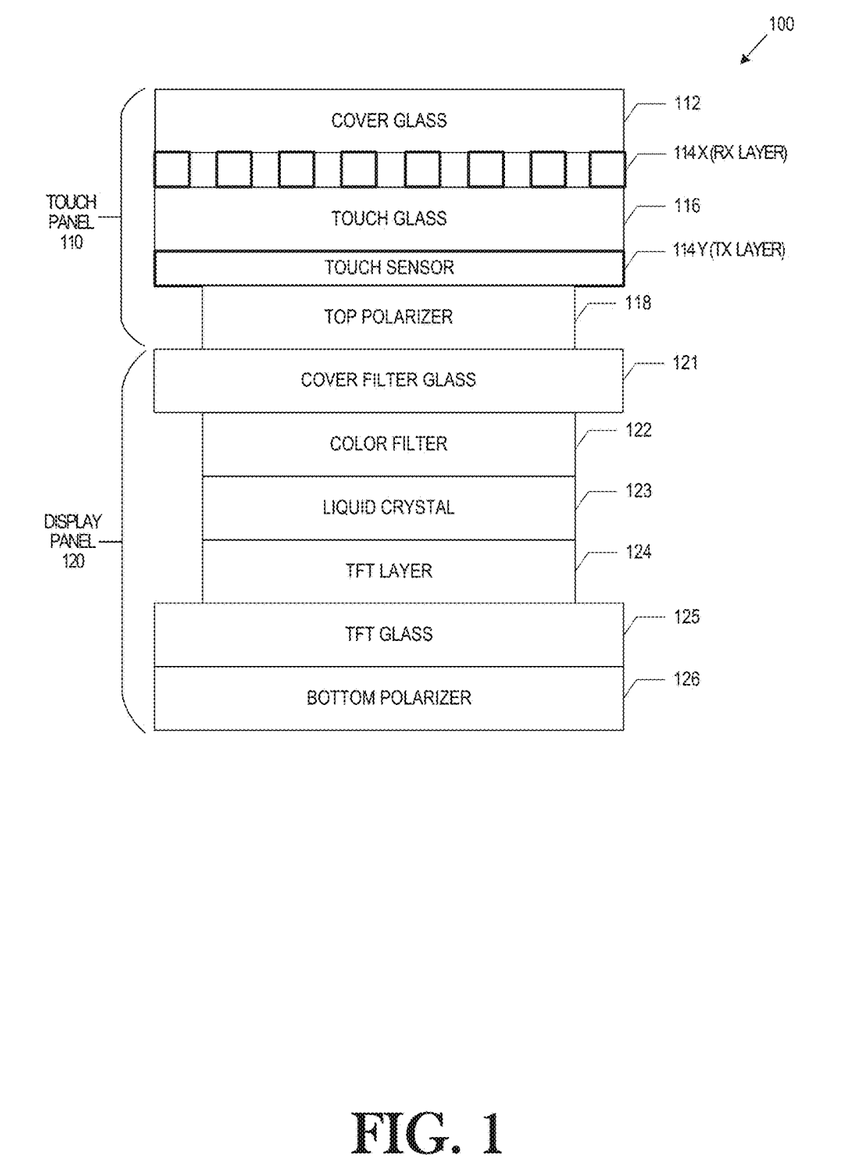
FIG. 1 illustrates a schematic side view diagram of a stack of components of a touch panel display in accordance with sonic aspects of the disclosure.

FIG. 1 illustrates a schematic side view diagram (in exaggerated dimension) of a stack of components of a touch panel display 100 in accordance with some aspects of the disclosure. Referring to FIG. 1, the touch panel display 100 can be a display of a computing device, such as a smart phone, a tablet, or another mobile device, and can include a touch panel 110 and a display panel 120.

The touch panel 110 may include a cover glass 112, a two-layer touch sensor 114 (e.g., 114X and 114Y), a touch glass 116 disposed between the two touch sensor layers, and a top polarizer layer 118. The touch sensor 114 can include receive (Rx) or sensing electrode traces in layer 114X, and transmit (Tx) or driving electrode traces in layer 114Y. A more detailed Bar Type diagram of the dual layer touch sensor is illustrated in reference to FIG. 2.

The display panel 120, which is located under the touch panel 110, can include a cover filter glass 121, a color filter 122, liquid crystal layer 123, thin film transistor (TFT) layer 124. TFT glass 125, and a bottom polarizer layer 126. These components of the display panel 120 are known, and thus for the sake of brevity their individual descriptions will not be provided here.

Figure 2:
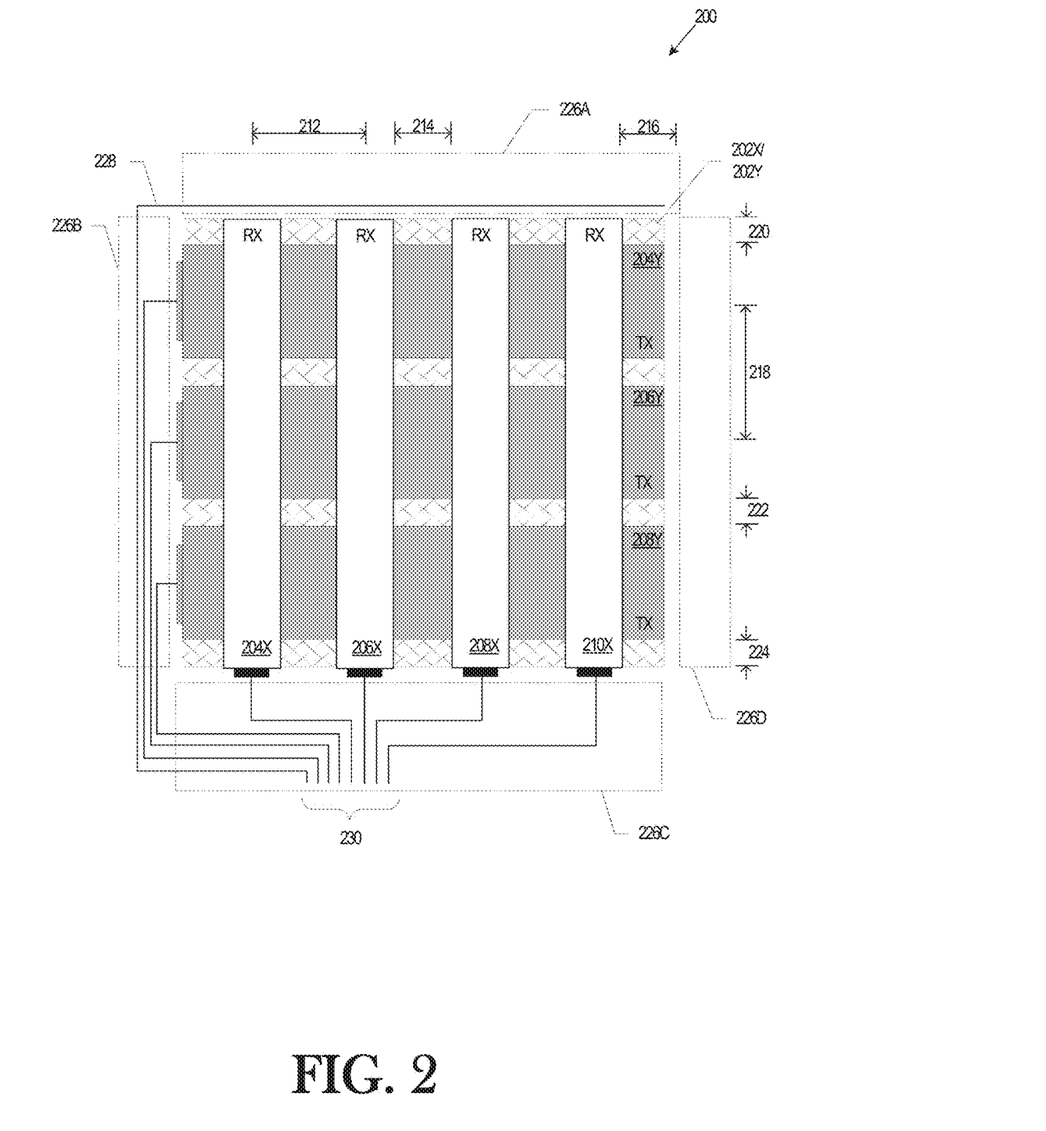
FIG. 2 illustrates a schematic plan view diagrams of a portion of a touch panel display including touch sensor layers in accordance with some aspects of the disclosure.

FIG. 2 illustrates a schematic plan view diagrams of a portion of a touch panel display including touch sensor layers in accordance with some aspects of the disclosure. Referring to FIG. 2, the touch sensor 200 (which can be the same as the touch sensor 114) can be based on Projected Capacitive Touch (PCT). More specifically, the touch sensor 200 can include electrode traces in layers 202X and 202Y (corresponding to layers 114X and 114Y). The electrode traces in corresponding layers can be used for electrode columns and rows. For example, the touch sensor 200 is made up of a matrix of Rx (or sense) electrode columns (or lines) 204X-210X, and Tx (or drive) electrode rows (or lines) 204Y-208Y of conductive material. In an example, the sense and drive lines can be layered on sheets of glass.

The drive electrode rows 204Y-208Y are spaced apart from the sense electrode columns 204X-210X. The drive electrode rows 204Y-208Y can be used to generate an electric field, and the sense electrode columns 204X-210X can receive the electric field. Overlapping portions of the drive electrode rows 204Y-208Y and the sense electrode columns 204X-210X form respective capacitors. When a conductive object, such as a user's finger or another contacting device (e.g., a stylus), comes into contact with the overlapping portions, the local electrostatic field becomes distorted at that point and grounds the respective capacitor. The variations of capacitance can be changed and measured at every overlapping portion of the matrix to trigger performing of touch-screen functionalities.

The sense electrode columns 204X-210X and the drive electrode rows 204Y-208Y can comprise indium tin oxide (ITO) transparent conductor, micro wire metal mesh, and/or one or more other materials as suitable for the intended purpose (e.g., other types of transparent conductors). The electrode columns and rows may be more generally known as electrode traces, and the terms columns and rows are not meant to be limiting. Further, the disclosure is not limited to PCT, but may be any touch panel technology as suitable for the intended purpose.

Referring to FIG. 2, the touch sensor 200 can further include sense electrode dummy areas (e.g., 214, 216) located between the sense electrode columns 204X-210X, as well as between an edge of the touch sensor 200 and a sense electrode column (e.g., dummy area 216). Similarly, the drive electrode dummy areas (e.g., 220, 222, and 224) are located between the drive electrode rows 204Y-208Y, as well as between an edge of the touch sensor 200 and a drive electrode row (e.g., dummy areas 220 and 224). The sense electrode dummy areas and the drive electrode dummy areas are areas where there are electrode traces which are not part of the sense electrode columns 204X-210X or the drive electrode rows 204Y-208Y.

The distance between respective drive electrode rows 204Y-208Y can be referred to as drive electrode row pitch 218, and the distance between respective sense electrode columns 204X-210X can be referred to as sense electrode column pitch 212. The pitch (e.g., 212 and 218) can be dependent on a target diameter of the touching object (e.g., a finger, stylus, etc.). The pitch can be, for example, about 5 mm for a finger touch. For the purpose of this discussion, the areas between respective drive electrode rows (or between a drive electrode row and an edge of the touch sensor) and also between the sense electrode columns (or between a sense electrode column and an edge of the touch sensor) can be referred to as "dummy areas." For example, there are sense electrode dummy areas between adjacent sense electrode columns 204X-210X, and drive electrode dummy areas between adjacent drive electrode rows 204Y-208Y.

The width of the drive electrode rows and the sense electrode columns can be based on the integrated circuit manufacturing requirements and/or tolerances, and can be, for example, approximately 1.6 mm. In this example, the width of the dummy areas can be, for example, about 3.4 mm. These widths are provided for exemplary purposes and the embodiments are not limited to these values.

In an example, the drive electrode rows 204Y-208Y and the sense electrode columns 204X-210X can be connected to routing traces 230. The routing traces 230 can also include a global ground 228, which can be a ground ring around the touch sensor 200, or a partial ring (e.g., as illustrated in FIG. 2). In an example, the global ground ring 228 can be co-planar with the electrode traces in touch sensor layer 202X or 202Y. Areas around the touch sensor 200, which can be used to place the routing traces can be referred to as routing traces areas. For example, FIG. 2 illustrates routing traces areas 226A, 226B, 226C, and 226D, with only routing traces areas 226B and 226C being occupied by routing traces for the drive electrode rows 204Y-208Y and the sense electrode columns 204X-210X. In an example, each of the routing traces area can be, for example, approximately 3 mm wide. These widths are provided for exemplary purposes and the embodiments are not limited to these values.

In an example, one or more hybrid antennas may be implemented so that one portion of the hybrid antenna (e.g., a radiation structure) is implemented within a routing traces area, and another portion of the hybrid antenna (e.g., a ground structure) is implemented within a dummy area of the touch sensor (e.g., using one or more electrode traces within the dummy area). In this regard, the portion of the antenna within the dummy area (e.g., an edge dummy area, which is a visible area of the touch panel display) is transparent, while the portion within the routing traces area (which is not visible) can be implemented using non-transparent conductive material. The hybrid antenna may be connected by a feed (e.g., at the radiation structure). The ground structure of the hybrid antenna can be directly connected to the global ground (e.g., 228). Additionally, the ground structure can be capacitively coupled to one or more electrode traces of the touch sensor layer 202X or 202Y. In an example, the hybrid antenna can be a planar inverted-F antenna (PIFA). Options for connecting the feed include coplanar waveguide (CPW) and pogo pins.

In an example, an edge antenna can be implemented within one or more of the routing traces areas (e.g., 226A or 226D). For example, a dipole antenna can be implemented within the routing traces area, and can be capacitively coupled to one or more electrode traces of the touch sensor layers 202X or 202Y. More detailed illustrations of the hybrid and edge antennas are illustrated in reference to FIGS. 3-5.

In this regard, the hybrid antenna and the edge antenna can be integrated into a touch panel display without compromising the touch sensitivity or the optical quality of the display. The proposed techniques for integrating a hybrid antenna can take advantage of the material discontinuity between view area transparent conductor material (e.g., the transparent conductive electrode traces of touch sensor layers 202X and 202Y) and the edge touch trace routing areas. The hybrid antenna also incorporates the radiation/feeding structures into a small unused bezel space used for touch sensor routing (e.g., routing traces areas 226A-226D) to incorporate the antenna structure to fit into this area with designed orientation and location. For antenna designs that require a large ground, the hybrid antenna can be capacitively coupled (AC-coupled) to the corresponding touch sensor layer (e.g., 202X or 202Y) so that all (or substantially all) of the electrode traces within the touch sensor layer are used as the ground.

Current integrated antenna solutions are metallic (non-transparent) conductor based and placed outside of the touch panel display, which requires additional large bezel area. Proposed integratable antenna solutions discussed herein can be based on transparent metallic conductor designs that integrated on the touch sensor, with feeding/radiation structures located within the touch sensor routing traces areas around the perimeter of the display to improve total antenna performance.

Figure 3:
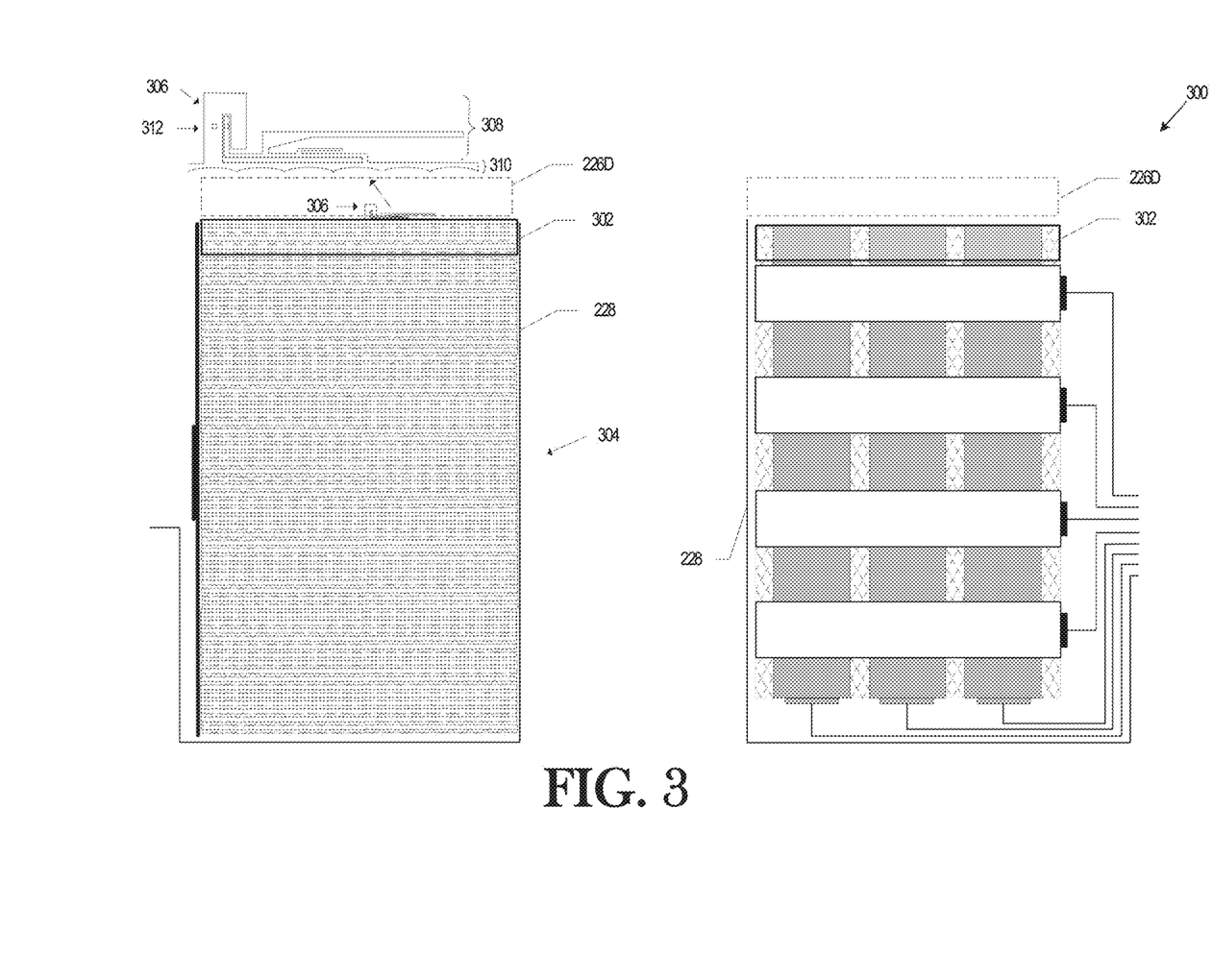
FIG. 3 and FIG. 4 illustrate example embodiments of hybrid antennas integratable with touch sensor layers in accordance with some aspects of the disclosure.
Figure 4:
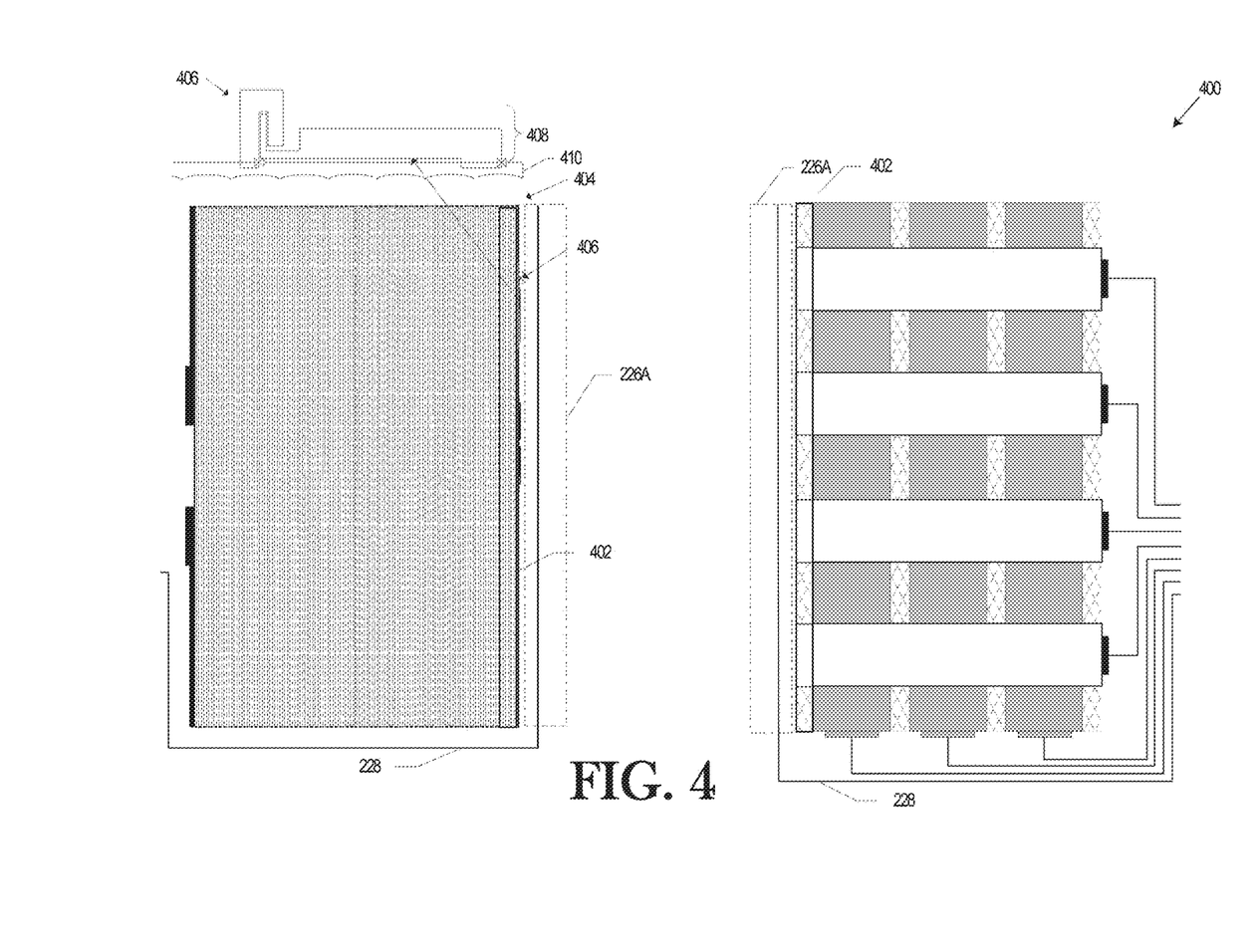

FIG. 3 and FIG. 4 illustrate example embodiments of hybrid antennas integratable with touch sensor layers in accordance with some aspects of the disclosure. Referring to FIG. 3, the diagram 300 illustrates the touch sensor 200 and a separate view of the RX touch sensor layer 202X. More specifically, the touch sensor layer 202X may include a plurality of electrode traces 304. The electrode traces 304 can comprise indium tin oxide (ITO) transparent conductor, micro wire metal mesh, and/or one or more other materials as suitable for the intended purpose (e.g., other types of transparent conductors). Some of the electrode traces 304 can be used to form the plurality of sense electrode columns 204X-210X.

FIG. 3 additionally illustrates an edge dummy area 302 and a routing traces area 226D. The edge dummy area 302 can be formed using some of the electrode traces 304 which are located between an edge of the touch sensor 200 and the sense electrode column 210X. In an example, a hybrid antenna 306 can be implemented using the edge dummy area 302 and the routing traces area 226D. More specifically, the hybrid antenna 306 can include a radiation structure 308 and a ground structure 310. The radiation structure 308 can be implemented within the routing traces area 226D, and the ground structure 310 can be implemented within the edge dummy area 302. For example, one or more of the electrode traces 304 within the edge dummy area 302 can be floating and unconnected to other electrode traces. The ground structure 310 can be one of those floating electrode traces within the edge dummy area 302, as seen in FIG. 3.

In an example, the radiation structure 308 can include feed terminal 312 for connecting the antenna 306 to a feed line. In an example, the hybrid antenna 306 can be connected to ground using the feed terminal 312. In another example, the hybrid antenna 306 can be connected to ground using the ground structure 310. More specifically, the ground structure 310 can be connected to the global ground ring 228 or to another ground connection available within the touch sensor 200. In an example, the ground structure 310 can be capacitively coupled (AC coupled) to a remaining portion of the electrode traces 304 (e.g., a remaining portion of the touch sensor layer 202X).

In this regard, the hybrid antenna 306 can combine display edge structures (e.g., radiation structure 308 within the routing traces area 226D) with display area touch sensor traces ground structure 310 can be implemented using an electrode trace within the edge dummy area 302) to improve antenna performance. Since the antenna radiation structure 308 is designed within the routing traces area (e.g., 226D), which is outside of the viewing area associated with the sensor layer 202X, solid metal structures can be used to implement the radiation structure 308. As a result, coupling is introduced between antenna structures and the touch sensor traces of sensor layer 202X for improved antenna performance. Additionally, by implementing the hybrid antenna using both an edge dummy area of the electrode traces (which are transparent conductors) and routing traces area, a material discontinuity is introduced between solid metal (e.g., structures within the routing traces area 226D) and meshed metal (e.g., structures within the edge dummy area located within the visible portion of the display) areas. Such discontinuity can result in edge and fringe coupling with the electrode traces within the display view area (i.e., the traces of the touch sensor layer 202X), which can improve antenna performance.

As seen in FIG. 3, the hybrid antenna 306 is implemented as planar inverted-F antenna (PIFA). Even though antenna 306 is illustrated as a PIFA, the disclosure is not limited in this regard and other types of antennas can be used. Additionally, even though hybrid antenna 306 is implemented within the routing traces area 226D and the edge dummy area 302, other routing traces areas and edge dummy areas associated with the touch sensor 200 can be used as well. For example and in reference to FIG. 2, routing traces area 226A or 226B can be used as well. In an example, the hybrid antenna 306 can include portions 308 and 310, which can be implemented as a single structure (e.g., ground structure can be implemented as a transparent conductor fused/connected with a non-transparent conductor used for the radiation structure 308).

Referring to FIG. 4, the diagram 400 illustrates the touch sensor 200 and a separate view of the TX touch sensor layer 202Y. More specifically, the touch sensor layer 202Y may include a plurality of electrode traces 404. The electrode traces 404 can comprise indium tin oxide (ITO) transparent conductor, micro wire metal mesh, and/or one or more other materials as suitable for the intended purpose (e.g., other types of transparent conductors). Some of the electrode traces 404 can be used to form the plurality of drive electrode rows 204Y-208Y.

FIG. 4 additionally illustrates an edge dummy area 402 (which can be the same as dummy area 220 in FIG. 2) and a routing traces area 226A. The edge dummy area 402 can be formed using some of the electrode traces 404 which are located between an edge of the touch sensor 200 and the drive electrode row 204Y. In an example, a hybrid antenna 406 can be implemented using the edge dummy area 402 and the routing traces area 226A. More specifically, the hybrid antenna 406 can include a radiation structure 408 and a ground structure 410. The radiation structure 408 can be implemented within the routing traces area 226A, and the ground structure 410 can be implemented within the edge dummy area 402. For example, one or more of the electrode traces 404 within the edge dummy area 402 can be floating and unconnected to other electrode traces. The ground structure 410 can be one of those floating electrode traces within the edge dummy area 402, as seen in FIG. 4. Additionally, as seen in FIG. 4, the hybrid antenna 406 can be implemented by overlaying the radiation structure 408 on top of an electrode trace (e.g., 410) within the edge dummy area 402. The ground structure 410 can be directly coupled (DC coupled) to ground (e.g., via the ground ring 228) or via a feeding terminal within the radiation structure 408). In an example, the ground structure 410 can be capacitively coupled (AC coupled) to electrode traces 404 of the touch sensor layer 202Y.

Figure 5:
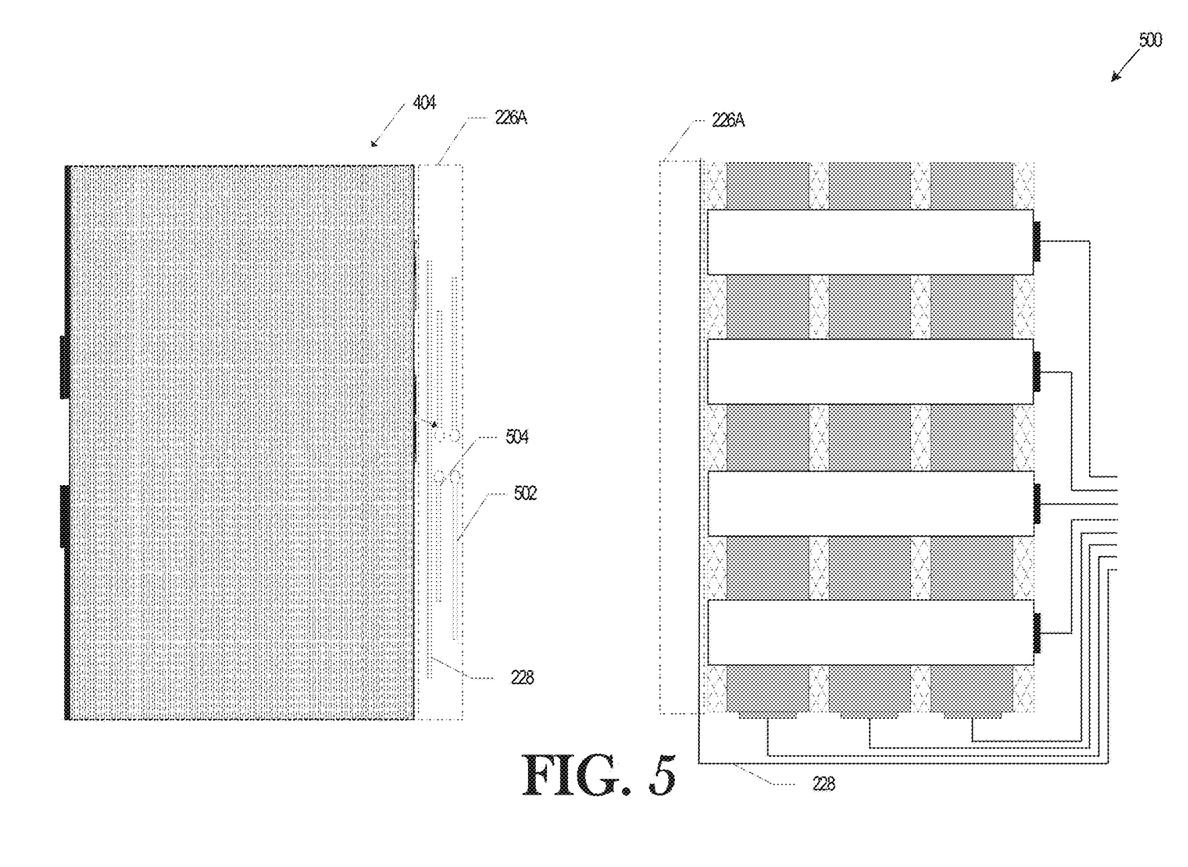
FIG. 5 illustrates an example embodiment of an edge antenna using portions of a touch panel display in accordance with some aspects of the disclosure.

FIG. 5 illustrates an example embodiment of an edge antenna using portions of a touch panel display in accordance with some aspects of the disclosure. Referring to FIG. 5, the diagram 500 illustrates the touch sensor 200 and a separate view of the TX touch sensor layer 202Y. More specifically, the touch sensor layer 202Y may include a plurality of electrode traces 404. The electrode traces 404 can comprise indium tin oxide (ITO) transparent conductor, micro wire metal mesh, and/or one or more other materials as suitable for the intended purpose (e.g., other types of transparent conductors). Some of the electrode traces 404 can be used to form the plurality of drive electrode rows 204Y-208Y.

FIG. 5 additionally illustrates a routing traces area 226A. In an example, an edge antenna 502 can be implemented within the routing traces area 226A. More specifically, edge antenna 502 can utilize unused areas surrounding the touch sensor 200, such as the routing traces area 226A (or other routing traces areas as illustrated in FIG. 2). In an example, the edge antenna 502 can be a dipole antenna (as seen in FIG. 5), but the disclosure is not limited in this regard and other types of antenna structures can be used as well for purposes of implementing an antenna within a routing traces area or other areas outside of the touch sensor 200. As seen in FIG. 5, the edge antenna 502 does not use a ground plane in order to radiate, which makes the edge antenna suitable for interference-friendly integration.

In an example, the edge antenna 502 can AC-couple with the ground ring 228, or with one or more of the electrode traces 404 of the touch sensor layer 202Y to gain additional antenna efficiency. In another example, the edge antenna 502 can include an additional antenna structure 504, which can function as additional reflective structure and to further facilitate AC coupling with the ground ring 228.

In an example, the coupling between the antenna structures (e.g., 502, 504) and the touch panel traces (e.g., 404) may be changed by changing the distance from the antenna structures to the edge of the sensor panel (e.g., 202Y) or to the ground ring 228. There may be an optimized range that can balance and gain maximum performance. By varying the distance between antenna 502 and the ground ring 228, extra antenna performance can be gained from the coupling between the antenna and the touch sensor traces. In an example, such distance may be 5 mm or less.

In an example, a hybrid antenna (such as antenna 306) can be implemented using an edge dummy area and a routing traces area of the touch sensor layer 202X (as seen in FIG. 3). Additionally, an edge antenna (such as antenna 502) can be implemented using a routing traces area of the touch sensor layer 202Y (as seen in FIG. 5). Furthermore, both the hybrid antenna (e.g., 306) and the edge antenna (e.g., 502) can be configured so that they are AC-coupled with each other for increased antenna efficiency.

Figure 6:
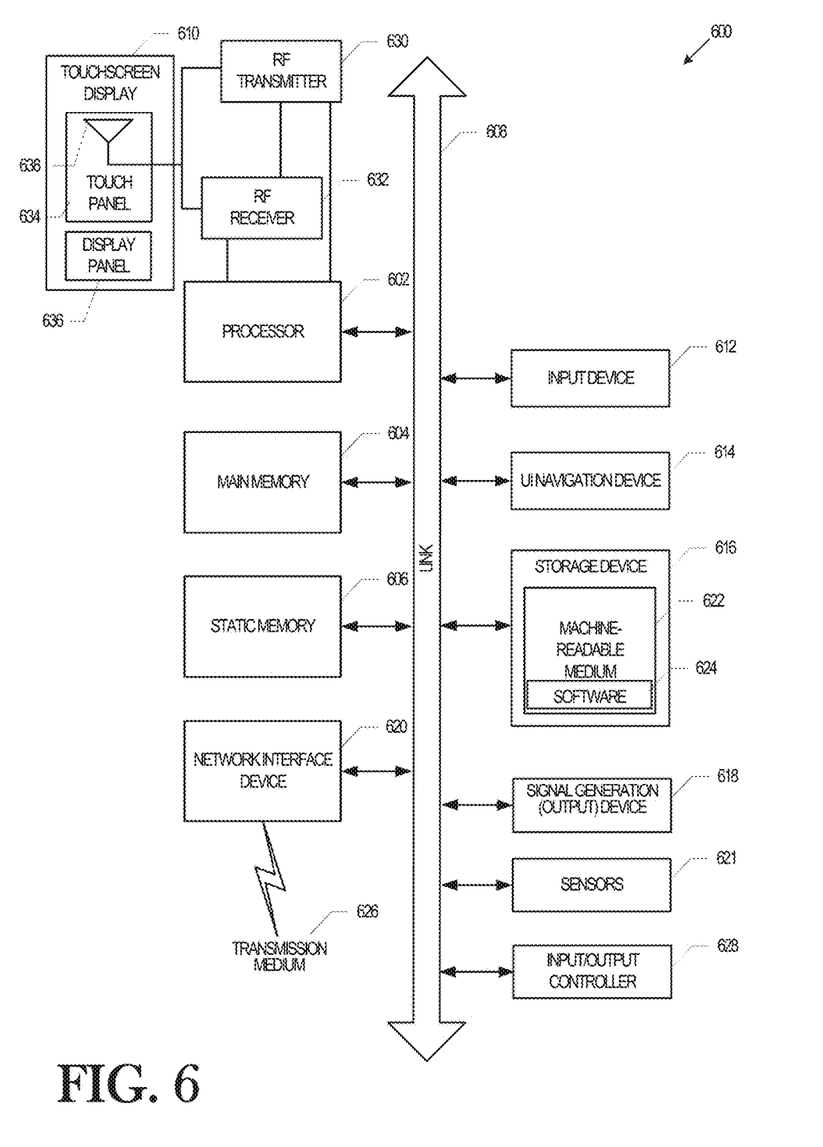
FIG. 6 illustrates an example device, which can utilize the integrated antennas described herein.

FIG. 6 illustrates an example device, which can utilize the integrated antennas described herein. In alternative embodiments, the communication device 600 may operate as a standalone device or may be connected (e.g., networked) to other communication devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 1100 may be a personal computer (PC), a tablet PC, a set top box (STB), a personal digital assistant (PDA), a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The communication device 600 may further include a display unit 610, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera (e.g., a panoramic or high-resolution camera), physical keyboard, trackball, or other input devices.

The communication device 600 may additionally include a storage device (e.g., drive unit) 616, a signal generation device 618 (e.g., a speaker, a projection device, or any other type of information output device), a network interface device 620, and one or more sensors 621, such as a global positioning system (GPS) sensor, compass, accelerometer, motion detector, or other sensor. The communication device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a communication device (or machine) readable medium 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the communication device 600. In an example, one or any combination of the hardware processor 602, the main memory 604, the static memory 606, or the storage device 616 may constitute communication device (or machine) readable media.

While the communication device readable medium 622 is illustrated as a single medium, the term "communication device readable medium" or "machine-readable medium" may include a single medium or multiple media (e.g., a centralized or distributed database, and/or associated caches and servers) configured to store the one or more instructions 624.

The term "communication device readable medium" or "machine-readable medium" may include any medium that is capable of storing, encoding, or carrying instructions for execution by the communication device 600 and that cause the communication device 600 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal. The term "communication device readable medium" or "machine-readable medium" do not include signals or carrier waves.

The instructions 624 may further be transmitted or received over a communications network 626 using a transmission medium via the network interface device 620 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), MIMO, or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the communication device 600, and includes digital or analog communications signals or other intangible medium to facilitate communication of such software.

In an example, the processor 602 can communicate with the RF transmitter 630 and the RF receiver 632 to transmit and receive wireless signals via the antenna 638. In an example, the RF transmitter 630 in the RF receiver 632 may be implemented within the network interface device 620.

In an example, the touchscreen display 610 can include a touch panel 634 and a display panel 636. The antenna 638 can be integrated within the touch panel 634. For example, the antenna 638 can be a hybrid antenna or an edge antenna as described herein above. The RF transmitter 630 can include suitable circuitry, logic, interfaces and code for transmitting radiofrequency signals via the antenna 638. The RF transmitter 630 can generate the radiofrequency signals using baseband signals sent from the processor 602. In this regard, the RF transmitter 630 can include an amplifier to amplify signals before transmission via the integrated antenna 638. The RF transmitter 630 in the RF receiver 632 can be configured to transmit and receive radiofrequency signals of any frequency including, microwave frequency bands (0.3 to 300 GHz), which include cellular telecommunications, W LAN and WWAN frequencies.

Although the operations of some of the disclosed methods are described in a particular, sequential order for convenient presentation, it should be understood that this manner of description encompasses rearrangement, unless a particular ordering is required by specific language forth below. For example, operations described sequentially may in some cases be rearranged or performed concurrently. Moreover, for the sake of simplicity, the attached figures may not show the various ways in which the disclosed methods can be used in conjunction with other methods.

Additional Notes & Examples

Example 1 is a touch panel for a display, the touch panel comprising: a touch sensor comprising a plurality of electrode traces, wherein a first portion of the plurality of electrode traces form sensing lines configured to receive touch input, the touch sensor having an edge dummy area between an edge of the touch sensor and one of the electrode traces of a remaining portion of the plurality of electrode traces, wherein the edge dummy area is outside of the sensing lines; and an antenna comprising a radiation structure and a ground structure, wherein the radiation structure is within a routing traces area outside of the touch sensor, and the ground structure is located within the edge dummy area.

In Example 2, the subject matter of Example 1 optionally includes wherein the ground structure comprises an electrode trace of the plurality of electrode traces located within the edge dummy area of the touch sensor.

In Example 3, the subject matter of Example 2 optionally includes wherein the electrode trace of the ground structure is disposed along the edge of the touch sensor.

In Example 4, the subject matter of any one or more of Examples 1-3 optionally include wherein the ground structure and the touch sensor comprise a same transparent conductive material.

In Example 5, the subject matter of Example 4 optionally includes wherein the transparent conductive material comprises indium tin oxide (ITO).

In Example 6, the subject matter of Example 5 optionally includes wherein the transparent conductive material comprises a micro-wire metal mesh.

In Example 7, the subject matter of any one or more of Examples 1-6 optionally include wherein the radiation structure comprises an opaque conductive material.

In Example 8, the subject matter of any one or more of Examples 1-7 optionally include wherein the antenna radiation structure is a planar inverted-F antenna (PIFA).

In Example 9, the subject matter of any one or more of Examples 1-8 optionally include a global ground ring, wherein the global ground ring is directly coupled to the ground structure and is co-planar with the touch sensor.

In Example 10, the subject matter of any one or more of Examples 1-9 optionally include wherein the ground structure is capacitively coupled to the plurality of electrode traces.

Example 11 is a touch panel for a display, the touch panel comprising: a first touch sensor layer comprising a first plurality of electrode traces forming a plurality of sensing lines; a second touch sensor layer comprising a second plurality of electrode traces forming a plurality of driving lines, the driving lines and the sensing lines configured to receive touch input; a global ground ring that is co-planar with the second touch sensor layer and is located within a routing traces area outside of the second touch sensor layer, the second touch sensor layer having edge dummy area located between an edge of the second touch sensor and one of the plurality of driving lines, wherein the edge dummy area is non-intersecting with the plurality of driving lines; and an antenna comprising a radiation structure and a ground structure, wherein the radiation structure is located within the routing traces area, and the ground structure is located within the edge dummy area and is coupled to the radiation structure.

In Example 12, the subject matter of Example 11 optionally includes wherein the radiation structure comprises a solid metal feed structure configured to receive an antenna feed line and an antenna ground line.

In Example 13, the subject matter of any one or more of Examples 11-12 optionally include wherein the ground structure is a floating ground structure within the edge dummy area.

In Example 14, the subject matter of any one or more of Examples 11-13 optionally include wherein the ground structure is an electrode trace located along the edge of the second touch sensor layer.

In Example 15, the subject matter of Example 14 optionally includes wherein the electrode trace forming the ground structure is directly coupled to the global ground ring.

In Example 16, the subject matter of any one or more of Examples 14-15 optionally include wherein the electrode trace forming the ground structure is capacitively coupled to the second plurality of electrode traces forming the second touch sensor layer.

In Example 17, the subject matter of any one or more of Examples 11-16 optionally include wherein the ground structure and the touch sensor comprise a same transparent conductive material.

In Example 18, the subject matter of Example 17 optionally includes wherein the transparent conductive material comprises indium tin oxide (ITO).

In Example 19, the subject matter of any one or more of Examples 17-18 optionally include wherein the transparent conductive material comprises a micro-wire metal mesh.

In Example 20, the subject matter of any one or more of Examples 11-19 optionally include a plurality of routing traces coupled to the plurality of driving lines and located within the routing traces area.

In Example 21, the subject matter of any one or more of Examples 11-20 optionally include a second radiation structure associated with a second antenna, wherein the second radiation structure is located within a routing traces area of the first touch sensor layer.

In Example 22, the subject matter of Example 21 optionally includes wherein the second radiation structure comprises a dipole antenna, the dipole antenna configured to receive an antenna feed line and an antenna ground line.

In Example 23, the subject matter of any one or more of Examples 21-22 optionally include a plurality of routing traces coupled to the plurality of sensing lines and located within the routing traces area and outside of the first plurality of electrode traces.

In Example 24, the subject matter of any one or more of Examples 21-23 optionally include wherein the second radiation structure is capacitively coupled to the global ground ring.

In Example 25, the subject matter of any one or more of Examples 21-24 optionally include wherein the second radiation structure is capacitively coupled to the first plurality of electrode traces forming the plurality of sensing lines.

In Example 26, the subject matter of any one or more of Examples 21-25 optionally include a reflective structure associated with the second antenna, wherein the reflective structure is located within the routing traces area of the first touch sensor layer, between the second radiation structure and an edge of the first touch sensor layer.

In Example 27, the subject matter of Example 26 optionally includes wherein the reflective structure comprises a dipole antenna.

In Example 28, the subject matter of any one or more of Examples 26-27 optionally include wherein the reflective structure is capacitively coupled to the second radiation structure and the first plurality of electrode traces forming the plurality of sensing lines.

Example 29 is a touch panel for a display, the touch panel comprising: a first touch sensor layer comprising a first plurality of electrode traces forming a plurality of sensing lines; a first radiation structure associated with a first antenna, wherein the first radiation structure is located within a routing traces area of the first touch sensor layer.

In Example 30, the subject matter of Example optionally includes wherein the first radiation structure is a dipole antenna, and the second radiation structure is a planar inverted-F antenna (PIFA).

In Example 31, the subject matter of any one or more of Examples 29-30 optionally include wherein the first radiation structure is capacitively coupled to the second radiation structure.

The above detailed description includes references to the accompanying drawings, which form a part of the detailed description. The drawings show, by way of illustration, specific aspects of the present disclosure that may be practiced. These aspects of the present disclosure are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other aspects of the present disclosure may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects of the present disclosure may feature a subset of said features. Further, aspects of the present disclosure may include fewer features than those disclosed in a particular example. Thus, the following claims are hereby incorporated into the Detailed Description, with a claim standing on its own as a separate embodiment. The scope of the aspects of the present disclosure disclosed herein is to be determined with reference to the appended claims, along with the full scope of equivalents to which such claims are entitled.

What is claimed is:

1. A touch panel for a display, the touch panel comprising:
a touch sensor comprising a plurality of electrode traces, wherein a first portion of the plurality of electrode traces form sensing lines configured to receive touch input,
the touch sensor having an edge dummy area formed between an edge of the touch sensor and one of the electrode traces of a remaining portion of the plurality of electrode traces, wherein the edge dummy area is outside of the sensing lines and is non-overlapping with the first portion of the plurality of electrode traces; and
an antenna comprising a radiation structure and a ground structure, wherein the radiation structure is within a routing traces area outside of the touch sensor, and the ground structure is located within the edge dummy area.

2. The touch panel of claim 1, wherein the ground structure comprises an electrode trace of the plurality of electrode traces located within the edge dummy area of the touch sensor.

3. The touch panel of claim 2, wherein the electrode trace of the ground structure is disposed along the edge of the touch sensor.

4. The touch panel of claim 1, wherein the ground structure and the touch sensor comprise a same transparent conductive material.

5. The touch panel of claim 4, wherein the transparent conductive material comprises indium tin oxide (ITO).

6. The touch panel of claim 5, wherein the transparent conductive material comprises a micro-wire metal mesh.

7. The touch panel of claim 1, wherein the radiation structure comprises an opaque conductive material.

8. The touch panel of claim 1, wherein the antenna radiation structure is a planar inverted-F antenna (PIFA).

9. The touch panel of claim 1, further comprising:
a global ground ring, wherein the global ground ring is directly coupled to the ground structure and is co-planar with the touch sensor.

10. The touch panel of claim 1, wherein the ground structure is capacitively coupled to the plurality of electrode traces.

11. A touch panel for a display, the touch panel comprising:
a first touch sensor layer comprising a first plurality of electrode traces forming a plurality of sensing lines;
a second touch sensor layer comprising a second plurality of electrode traces forming a plurality of driving lines, the driving lines and the sensing lines configured to receive touch input;
a global ground ring that is co-planar with the second touch sensor layer and is located within a routing traces area outside of the second touch sensor layer,
the second touch sensor layer having edge dummy area formed between an edge of the second touch sensor layer and one of the plurality of driving lines, wherein the edge dummy area is non-intersecting with the plurality of driving lines; and
an antenna comprising a radiation structure and a ground structure, wherein the radiation structure is located within the routing traces area and is non-overlapping with the driving lines and the sensing lines, and the ground structure is located within the edge dummy area and is coupled to the radiation structure.

12. The touch panel of claim 11, wherein the radiation structure comprises a solid metal feed structure configured to receive an antenna feed line and an antenna ground line.

13. The touch panel of claim 11, wherein the ground structure is a floating ground structure within the edge dummy area.

14. The touch panel of claim 11, wherein the ground structure is an electrode trace located along the edge of the second touch sensor layer.

15. The touch panel of claim 14, wherein the electrode trace forming the ground structure is directly coupled to the global ground ring.

16. The touch panel of claim 14, wherein the electrode trace forming the ground structure is capacitively coupled to the second plurality of electrode traces forming the second touch sensor layer.

17. The touch panel of claim 11, wherein the ground structure and the touch sensor comprise a same transparent conductive material.

18. The touch panel of claim 17, wherein the transparent conductive material comprises indium tin oxide (ITO).

19. The touch panel of claim 17, wherein the transparent conductive material comprises a micro-wire metal mesh.

20. The touch panel of claim 11, further comprising:
a plurality of routing traces coupled to the plurality of driving lines and located within the routing traces area.

21. The touch panel of claim 11, further comprising:
a second radiation structure associated with a second antenna, wherein the second radiation structure is located within a routing traces area of the first touch sensor layer.

22. The touch panel of claim 21, wherein the second radiation structure comprises a dipole antenna, the dipole antenna configured to receive an antenna feed line and an antenna ground line.

23. The touch panel of claim 21, further comprising:
a plurality of routing traces coupled to the plurality of sensing lines and located within the routing traces area and outside of the first plurality of electrode traces.

24. A touch panel for a display, the touch panel comprising:
a first touch sensor layer comprising a first plurality of electrode traces forming a plurality of sensing lines;
a first radiation structure associated with a first antenna, wherein the first radiation structure is located within a routing traces area of the first touch sensor layer; and
a second radiation structure associated with a second antenna, wherein the second radiation structure is located within the routing traces area of the first touch sensor layer and is non-overlapping with the first radiation structure.

25. The touch panel of claim 24, wherein the first radiation structure is a dipole antenna, and the second radiation structure is a planar inverted-F antenna (PITA).

* * * * *

UNITED STATES PATENT AND TRADEMARK OFFICE
CERTIFICATE OF CORRECTION

PATENT NO. : 10,241,631 B2
APPLICATION NO. : 15/465261
DATED : March 26, 2019
INVENTOR(S) : Chai et al.

Page 1 of 1

It is certified that error appears in the above-identified patent and that said Letters Patent is hereby corrected as shown below:

In the Claims

Column 14, Line 60, Claim 25, delete "(PITA)." and insert --(PIFA).-- therefor

Signed and Sealed this
Twenty-first Day of April, 2020

Andrei Iancu
*Director of the United States Patent and Trademark Office*